United States Patent [19]

Nussbaum

[11] 3,927,811
[45] Dec. 23, 1975

[54] COLLAPSIBLE CARRIER FOR BICYCLES
[75] Inventor: Henry Nussbaum, Los Angeles, Calif.
[73] Assignee: Henry Nussbaum
[22] Filed: May 6, 1974
[21] Appl. No.: 467,613

[52] U.S. Cl. .................. 224/42.03 B; 224/29 R
[51] Int. Cl.² .......................................... B60R 9/10
[58] Field of Search ....... 224/42.03 B, 42.07, 42.08, 224/42.43, 42.44, 29 R; 248/188.6; 108/128, 160, 80, 131, 132; 297/371, 372

[56] References Cited
UNITED STATES PATENTS
| 484,965 | 10/1892 | Jordan | 108/80 |
| 2,806,512 | 9/1957 | Whalen | 297/371 |
| 3,710,999 | 1/1973 | Allen | 224/42.03 B |

OTHER PUBLICATIONS
Allen Universal Bike Rack, Instructions, R. A. Allen Co., Bowles Terrace, Lincoln, Mass. 08/15/1972/

Primary Examiner—Robert J. Spar
Assistant Examiner—Jerold M. Forsberg
Attorney, Agent, or Firm—Marvin H. Kleinberg

[57] ABSTRACT

A collapsible carrier for bicycles, luggage and the like includes two substantially u-shaped members pivotally connected. Latching slide members lock the members at right angles when in use and permit the members to fold for storage and transport. The carrier is adapted to mount on a vehicle utliizing attaching straps fastened to the base of one member and a cross brace joining the arms of the other member.

2 Claims, 7 Drawing Figures

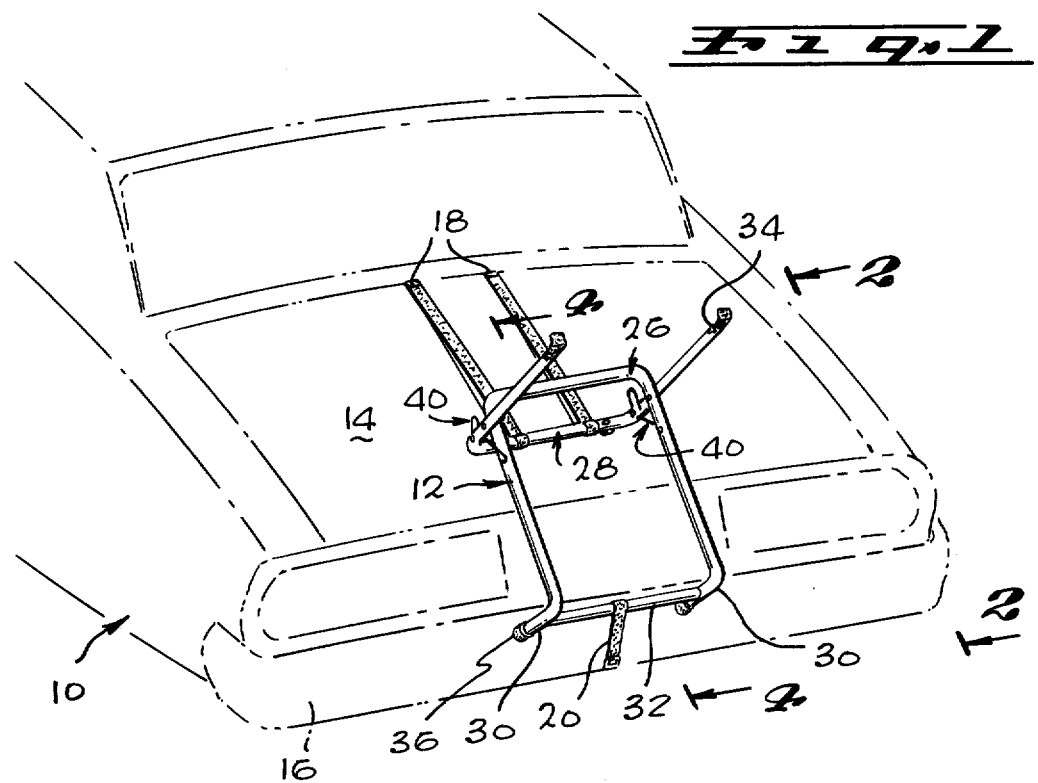
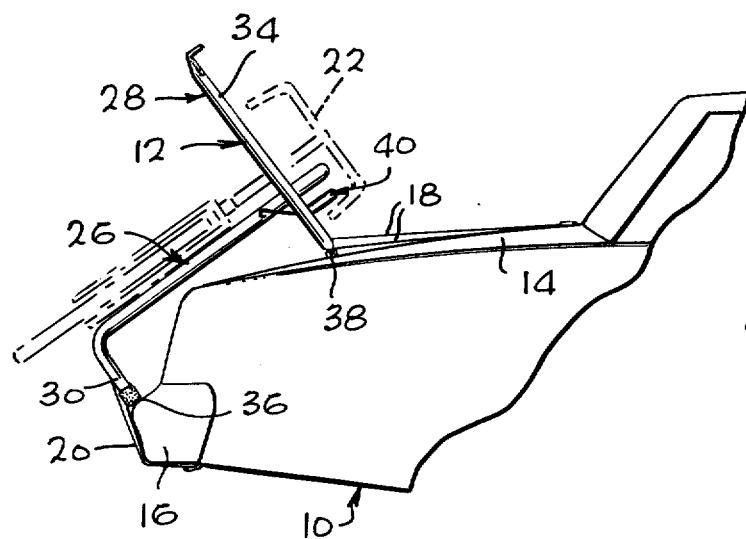
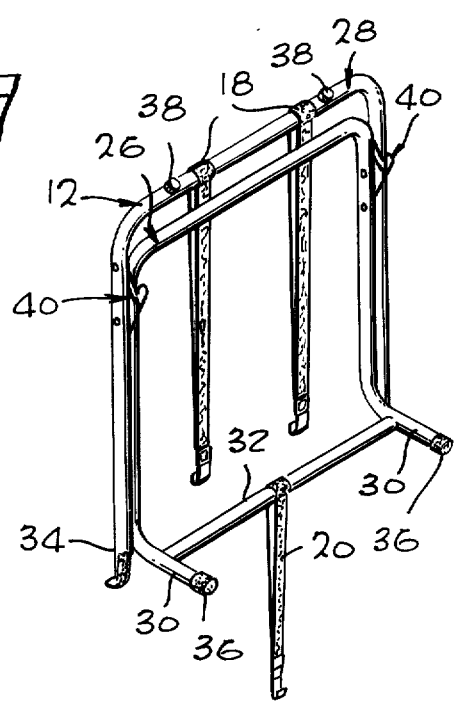

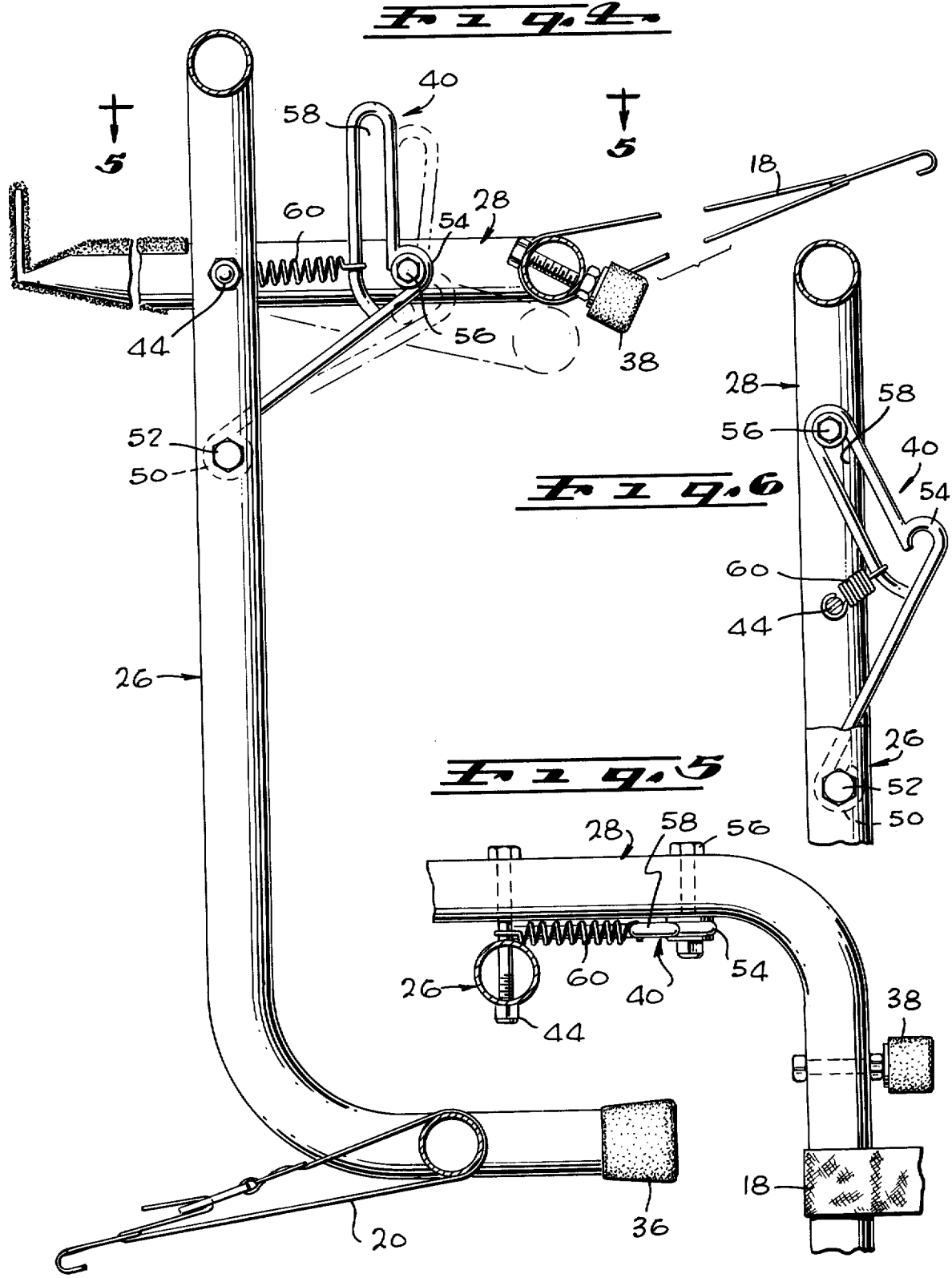

COLLAPSIBLE CARRIER FOR BICYCLES

BACKGROUND OF THE INVENTION

1. Field of the Invention

The present invention relates to a carrier adapted to be attached to a motor vehicle and, more particularly, to a carrier intended to support one or more bicycles on the motor vehicle.

2. Description of the Prior Art

In recent years, the bicycle has achieved increasing popularity, not only for transportation, but for recreation as well. There has always been a need for a carrier device which would enable a bicycle owner to transport one or more bicycles from place to place with a motor vehicle, recognizing that the size and construction of the bicycle makes it ill suited for carrying within an automobile or other motor vehicles. Further, it is frequently necessary to transport several bicycles from place to place.

Preferably, the carrier should be attractive, easily mounted upon the vehicle, and easily demounted and stored. Further, it would be preferable to have a device that could support two or more bicycles conveniently. Further, it should not be necessary to lift the bicycle to the roof of the vehicle, but rather to a position preferably no higher than shoulder height of the person using the carrier and/or the bicycle.

Many automobile carriers have been shown in the prior art, many of which are intended to be permanently affixed to the vehicle. Note, for example, the patents to Hinkston, U.S. Pat. No. 3,670,935; Allen, U.S. Pat. No. 3,437,248; Donnelley, U.S. Pat. No. 2,512,267; or Del Cano, U.S. Pat. No. 2,432,732. Yet other racks have been devised which are demountable, such as the racks disclosed in the patents to Weigl, U.S. Pat. No. 3,752,375; Allen, U.S. Pat. No. 3,710,999; or Yuda, et al., U.S. Pat. No. 3,204,839. Of the above-mentioned devices, only the apparatus of Hinkston is intended to collapse when not in use, but Hinkston is intended for permanent mounting upon the vehicle. None of the racks which can be mounted and demounted easily have the further feature that they can be collapsed for easy storage. The carrier disclosed by Allen, of course, can be easily reconfigured and, to that extent, may be deemed collapsible.

SUMMARY OF THE INVENTION

According to the present invention, a folding bicycle rack has been developed which can be easily mounted or demounted from a motor vehicle. Essentially, the rack is made up of a first substantially U-shaped member, which is intended to support bicycles, pivotally mounted to a second U-shaped member, having L-shaped terminations of the arms and a bracing member joining the arms.

Sliding latches lock the two U-shaped members into a substantially orthogonal configuration, the normal carrying position. The latches, when released, permit the members to rotate relative to each other into a collapsed configuration.

A pair of straps are provided on the crosspiece of the supporting U-shaped member, adapted to engage the trunk of the vehicle. A second strap is mounted to the crosspiece of the second U-shaped member and is adapted to hook to the bumper or frame of the vehicle.

In alternate uses, the rack can be inverted with the pair of straps exchanged with the second strap. The outward extending arms of the first u-shaped member now are positioned at the base of the assembly and can be used to support luggage or boxes or even relatively heavy bikes which could not be easily lifted.

With the rack in place, the straps, when tightened, tend to hold the rack firmly in place against the vehicle. Appropriate resilient bumper members at the points of contact with the vehicle, prevent damage to the finish of the vehicle while bicycles are being transported.

To remove the rack, the second strap is loosened which then permits some freedom of movement of the rack itself. The first u-shaped member is lifted slightly and the latch locks are then released, permitting the first u-shaped member to pivot thereby releasing the pair of straps, enabling their removal from the vehicle. The collapsed rack then is easily carried and stored while not in use.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is a perspective view of a collapsible carrier for bicycles according to the present invention, mounted on an automobile deck lid;

FIG. 2 is a side view of the rack of FIG. 1 taken along line 2—2 in the direction of the appended arrows and showing in phantom, a bicycle mounted thereon;

FIG. 3 is a perspective view of the carrier of the present invention in a collapsed configuration;

FIG. 4 is a side section view of the carrier of FIG. 1, taken along the lines 4—4 in the direction of the appended arrows;

FIG. 5 is a top view of a portion of the carrier of FIG. 4, taken along the line 5—5 in the direction of the appended arrows;

FIG. 6 is a detailed side-sectional view showing a folding latch member; and

Figure 7:
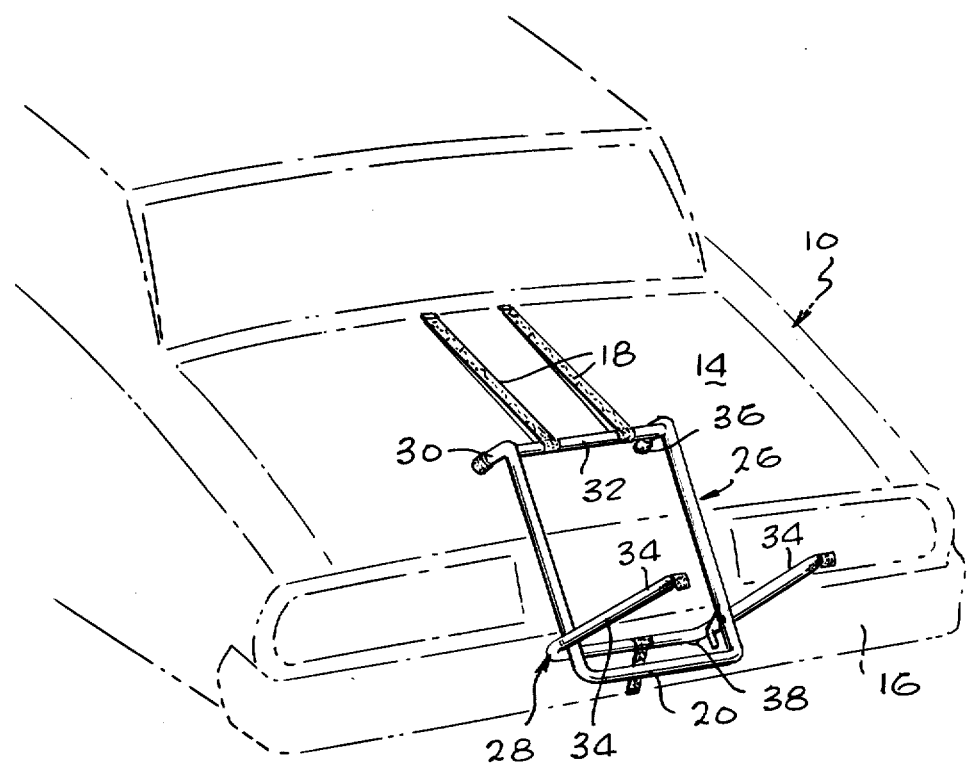
FIG. 7 is a perspective view of the carrier inverted as a luggage rack.

Turning first to FIG. 1, there is shown a conventional automobile 10 with the collapsible carrier of the present invention 12 attached to the rear deck 14 and the bumper 16 of the vehicle. As will be readily understood, the shape of the vehicle is substantially immaterial in that the carrier is provided with a first pair of straps 18 and a second strap 20 which, between them tightly affix the carrier to the vehicle as will be shown in connection with the description below.

FIG. 2 illustrates in a slightly better fashion the mode of fastening the carrier 12 to the vehicle 10. The upper straps 18 are clipped under the seam of the deck lid 14 and the second strap 20 is hooked underneath the bumper 16. A bicycle 22 shown in phantom, is carried by the carrier 12 and is supported both by the main frame member 26 and the extending arm 28.

Turning next to FIG. 3, the folded carrier is shown independent of a vehicle. As seen in FIG. 3, the carrier includes basically a first u-shaped member 26 and a second u-shaped member 28. The first u-shaped member 26 includes L-shaped extensions 30 of the arm of the u and a stiffening cross member 32 joins the L-extensions. The second strap 20 is mounted on the cross member 32.

The second u-shaped member 28 includes a bearing surface 34 for the bicycles to be supported and carries the pair of straps 18, for attachment to the upper portion or deck 14 of the vehicle 10. The ends of the L-shaped members include bumper elements 36 to protect the vehicle 10, when installed. Similarly, separate bumpers 38 are installed on the second u-shaped member to rest against the vehicle and prevent damage from the second u-shaped member.

A pair of folding latch arm members 40, best described in connection with FIGS. 4 and 6, below, enable a rigid connection between the two u-shaped members 26, 28 when in the assembled configuration. The two u-shaped members are joined by pivot members 44 which enable the first and second members 26, 28 to rotate relative to each other.

Turning next to FIGS. 4, 5 and 6, there is shown, in greater detail, the folding latch members 40. In a preferred embodiment, the folding latch arm member 40 is fabricated from round stock and includes a first shaped eyelet 50 which is fastened to the first u-shaped member 26 by a suitable rivet or bolt 52. A second eyelet 54 is formed in the round stock to engage a second bolt or rivet 56, which engages the second u-shaped member 28.

The latch member 40 further includes an elongated slot portion 58 in which the bolt 56 is constrained to travel when the u-shaped members 26 and 28 rotate relative to each other. A bias spring 60 urges the latch member 40 toward the pivot member 44, to maintain, in a locked configuration, the second bolt or fastener 56 in the eyelet 54.

FIG. 6 shows the latch member 40 with the rack 12 in the folded configuration. As seen, the bolt 56 is located at the remote end of the slot 58 of the latch member. Further, the bias spring 60 is substantially relaxed. As the two u-shaped arms 26, 28 are rotated relative to each other, the bolt 56 travels in the slot 58, rotating the entire latch member 40 about the bolt 52, stretching the bias spring 60.

When the two arms 26, 28 are substantially at right angles to each other, the bolt 56 engages the second eyelet 54 and, because of the configuration, is locked in place by the shape of the eyelet, and by the force of bias spring 60, urging the latching member 40 toward the first u-shaped member 26.

In order to collapse the carrier unit 12, the second u-shaped arm 28 must be simultaneously pushed upward from the bicycle-carrying end, as the latch members 40 are pressed toward the vehicle, tending to rotate the latch member 40 in the clockwise direction as viewed in FIG. 4. This disengages the bolt 56 from the eyelet 54 and enables the bolt 56 to travel in the slot 58. The u-shaped members 26, 28 rotate relative to each other to reach the collapsed configuration.

Turning finally to FIG. 7, there is shown, in perspective view, the carrier of FIG. 1, mounted in an inverted configuration to function as a collapsible luggage rack. The only modification necessary would be the attachment of the holding strap 20 to the second u-shaped member 28, and the relocation of the pair of holding straps 18 to the cross member 32 of the first u-shaped member 26. All other elements of the carrier 12 function in combination with the vehicle as before, except that the opposite sides of the support arms 34 would be employed to support the load.

Thus there has been disclosed a novel, collapsible carrier which is adapted to mount upon a vehicle and which may be used to transport bicycles in the normal, upright configuration. In an inverted configuration the carrier may transport luggage or heavier bicycles which cannot be lifted easily. A rotatable slotted latch member serves both as a latch and as a bracing support to hold a first substantially u-shaped member at right angles to a second substantially u-shaped member.

The latch member must therefore be sufficiently rigid to support any load that would be applied through the extending arms of the second u-shaped member. The novel configuration of the latch member permits both locking of the u-shaped members in the orthogonal relationship and, through manipulation of the latches permits the u-shaped members to rotate, relative to each other, into the collapsed configuration for storage and/or transportation.

Other variations will become apparent to those skilled in the art without departing from the teachings of the invention. Accordingly, the scope of the invention should be limited only by the claims appended hereto.

What is claimed as new is:

1. In a carrier for mounting on an automobile or the like, the combination comprising:
 a. first u-shaped member having a base portion and leg members attached thereto and extending therefrom, a substantially perpendicular leg interconnected with each extending leg member at the end of the leg opposite its connection to the base;
 b. a second u-shaped member having a base portion and elongated leg members, acting as carrying members;
 c. first cross means connecting said perpendicular legs near the interconnections of the extending legs to the perpendicular legs;
 d. pivot means, rotatingly coupling the extending leg members and the elongated leg members of said first and second u-shaped members;
 e. latching bracing means connecting the extending leg members and the elongated leg members of said u-shaped members, for rigidly configuring said u-shaped members at substantially right angles to each other with said perpendicular legs adapted to bear against a surface of said vehicle with said carrying members extending oppositely outward and for permitting said u-shaped members to rotate relative to each other to assume a substantially parallel configuration for compact storage;
 f. said latching bracing means including an elongated bracing member having an elongated substantially J-shaped slot therein, and operable with a cooperating post slidable therein for locking said U-shaped members in the carrying configuration;
 g. biasing means coupled to said latching bracing means for urging said bracing member slot into a locking engagement with the cooperating post; and
 h. first and second attaching members connected to said first cross means and said second U-shaped member base portion, respectively, said attaching members being adapted to fasten to an automobile or the like.

2. The carrier of claim 1, wherein said second u-shaped member base portion includes bearing members adapted to bear against a surface of said vehicle to support said second u-shaped member.

* * * * *